United States Patent [19]

Lovett

[11] 4,353,584
[45] Oct. 12, 1982

[54] LOCKABLE REMOVABLE DECORATIVE AND PROTECTIVE PANELS FOR VEHICLES

[76] Inventor: Bruce E. Lovett, 1005 Congress La., McLean, Va. 22101

[21] Appl. No.: 238,073

[22] Filed: Feb. 25, 1981

Related U.S. Application Data

[63] Continuation-in-part of Ser. No. 100,262, Dec. 4, 1979, abandoned.

[51] Int. Cl.$^3$ .............................................. B60R 19/00
[52] U.S. Cl. ....................................... 293/1; 293/128; 52/718
[58] Field of Search ................... 293/120, 126, 128, 1; 280/770; 52/716, 717, 718; 428/31; 180/69 R

[56] References Cited

U.S. PATENT DOCUMENTS

| | | | |
|---|---|---|---|
| 2,049,501 | 8/1936 | Herron | 52/717 |
| 2,220,826 | 11/1940 | Place | 52/718 |
| 3,388,523 | 6/1968 | Evans | 293/128 |
| 3,897,967 | 8/1975 | Barenyi | 293/120 |
| 4,066,285 | 1/1978 | Hall et al. | 293/1 |
| 4,142,753 | 3/1979 | Klie et al. | 293/120 |

Primary Examiner—Robert R. Song
Attorney, Agent, or Firm—Jay M. Cantor

[57] ABSTRACT

A holding frame for use on vehicles wherein inserts, such as plastic sheets, are slidable into the holding frame and, if desired, lockable therein. The holding frame is three sided and receives panels therein which are of substantially the same shape as the frame and held in place between the frame and the vehicle surface. A locking member is positionable at the open end of the frame to prevent the panels from sliding out of the frame or being physically removed by unauthorized persons.

In an alternative embodiment, an indentation is provided in an outer surface of the vehicle, such as the door, hood, trunk lid, etc., and an insert of substantially the same shape as the indentation is positioned in the indentation. The insert has a retaining member secured to the rear surface thereof which passes through the vehicle surface to the vehicle interior where it is secured to the vehicle.

5 Claims, 7 Drawing Figures

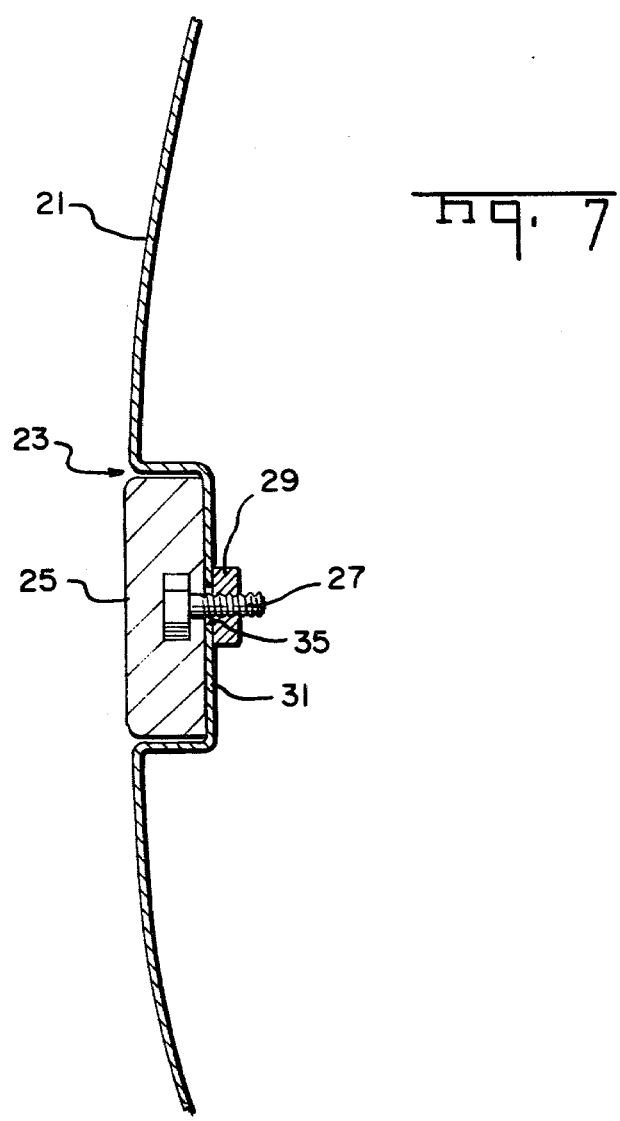

LOCKABLE REMOVABLE DECORATIVE AND PROTECTIVE PANELS FOR VEHICLES

CROSS REFERENCE TO PRIOR APPLICATION

This application is a continuation-in-part of my prior application, Ser. No. 100,262, filed Dec. 4, 1979, abandoned.

BACKGROUND OF THE INVENTION

1. Field of the Invention

This invention relates to ornamental and/or protective panels which can be removably positioned and locked onto the surface of a vehicle.

2. Description of the Prior Art

Decorative and/or protective removable panels for motor vehicles have been used in the prior art. Typical examples of such prior art are set forth in the U.S. patents of Hall (No. 4,066,285). Evans (No. 3,388,523), Loew (No. 3,869,332). Rubin (No. 4,083,592), Place (No. 2,220,826), Mohs (No. 4,154,504), Herrow (No. 2,049,501) and Krysiak (No. 4,160,052). These prior art panels have generally been in the form of removable strips or substantially non-removable panels and all of the prior art strips and panels, where removable, could be removed from the vehicle exterior directly because the fastening member was accessible from the vehicle exterior. Accordingly, such prior panels were easily removed by vandals and the like.

SUMMARY OF THE INVENTION

In accordance with the present invention there is provided a frame for a vehicle with removable inserts wherein the open sided portion of the frame includes a locking member for locking panels into the frame. The locking member is controllable from the interior of the vehicle surface on which it is disposed. The panels conform to the outer contours of the vehicle surface and are convex on certain door regions to provide protection against damage from contact by doors of other vehicles or the like.

In an alternative embodiment, an indentation is provided in an outer surface of the vehicle, such as the door, hood, trunk lid, etc., and an insert of substantially the same shape as the indentation is positioned in the indentation. The insert has a retaining member secured to the rear surface thereof which passes through the vehicle surface to the vehicle interior where it is secured to the vehicle.

BRIEF DESCRIPTION OF THE DRAWINGS

FIG. 4 is a view taken along the line 4—4 of FIG. 2;

FIG 5 is a side view of the vehicle showing a portion of the locking member;

FIG. 6 is a view taken along the line 5—5 of FIG. 5; and

FIG. 7 is a cross-sectional view of a second embodiment in accordance with the present invention.

DESCRIPTION OF THE PREFERRED EMBODIMENTS

Figure 1:
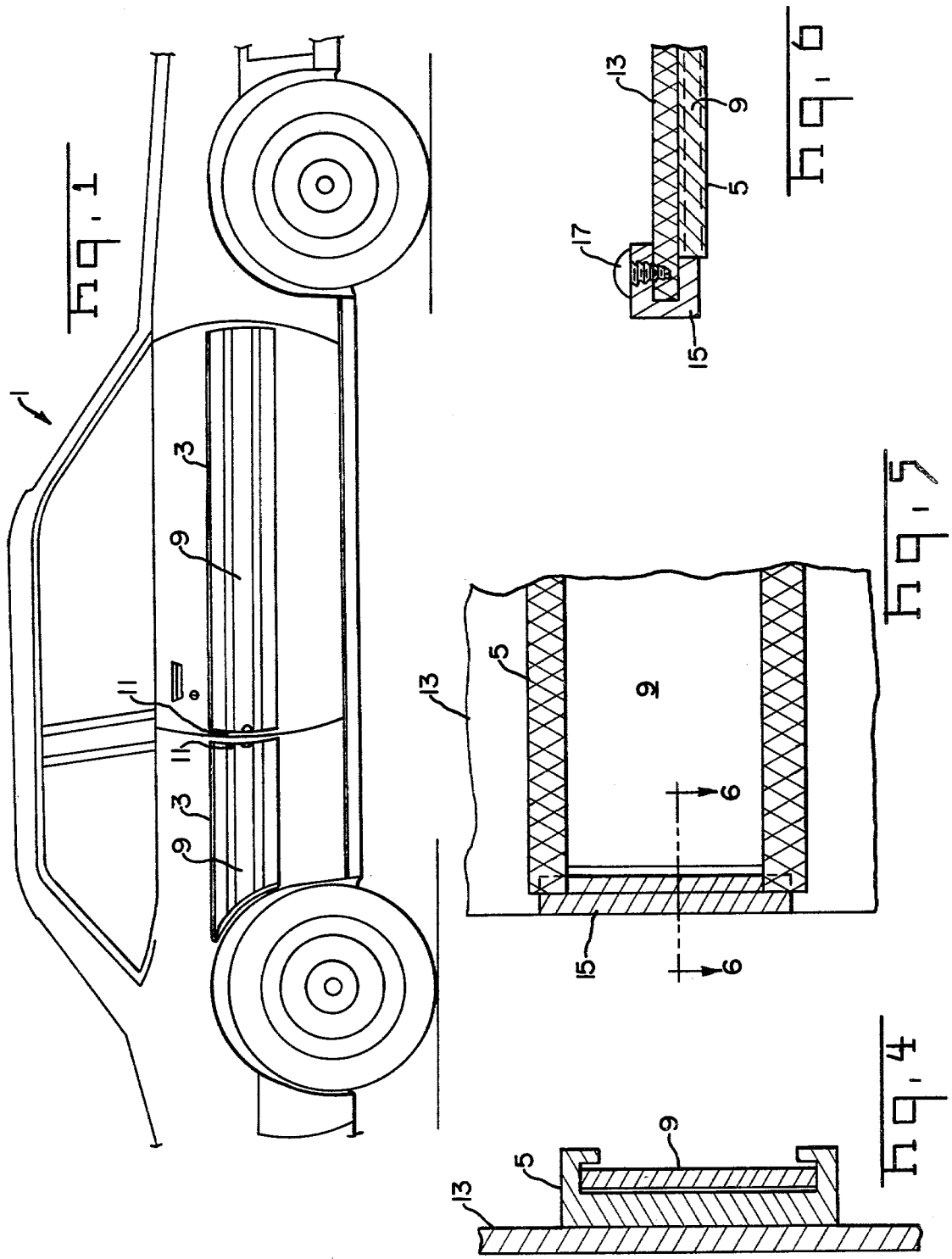
FIG. 1 is a side view of a vehicle showing a frame, panel and locking member in accordance with the present invention.
Figure 2:
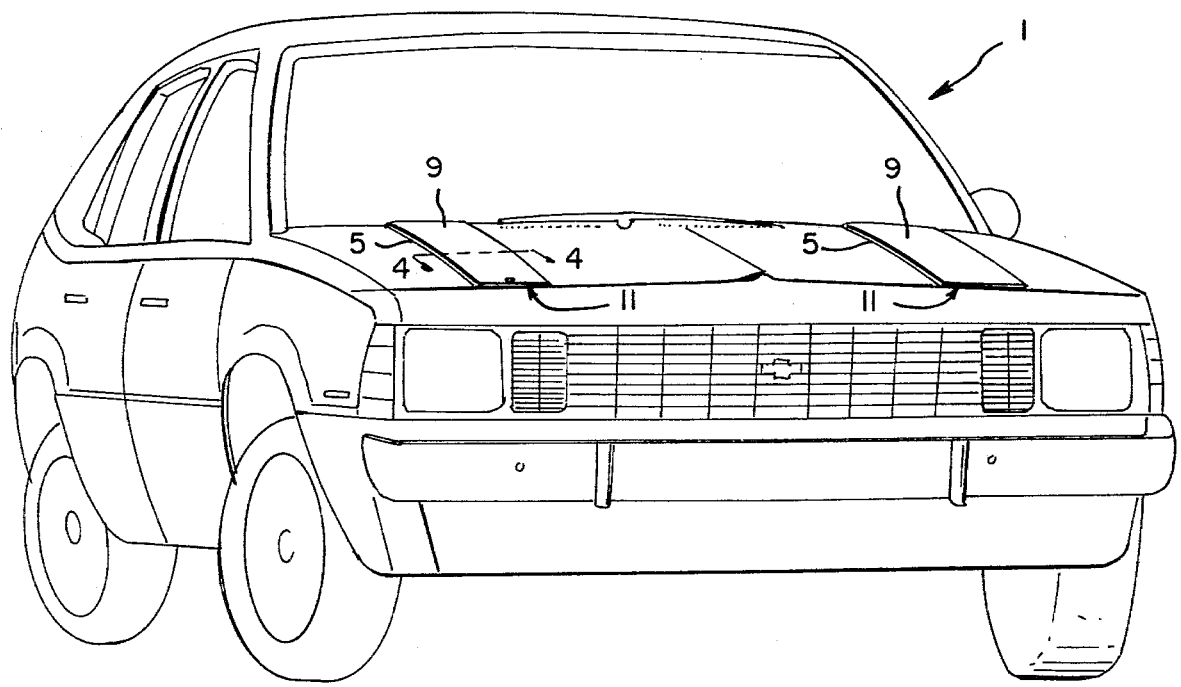
FIG. 2 is a front view as in FIG. 1 but with the frame, panel and locking members on the vehicle hood.
Figure 3:
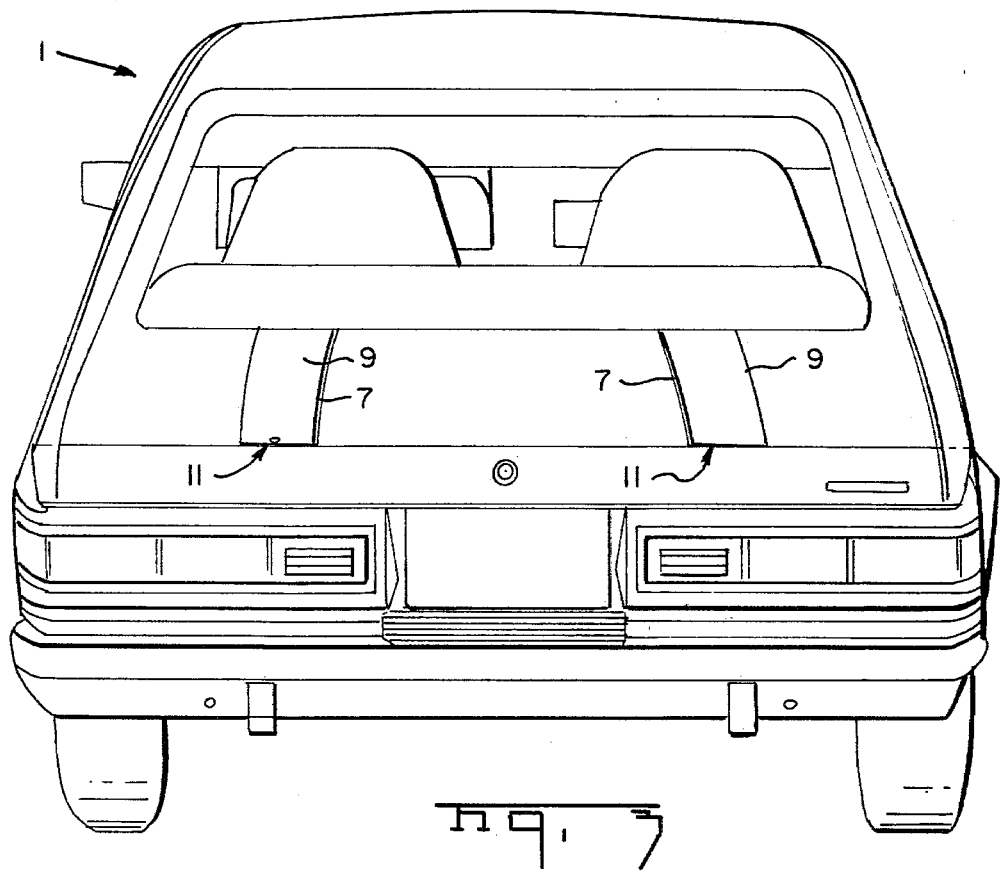
FIG. 3 is a rear view as in FIG. 1 but with the frame, panel and locking member on the vehicle trunk.

Referring first to FIGS. 1 to 3, there is shown a vehicle 1 having a frame 3 secured thereto on the side (FIG. 1), a frame 5 secured thereto on the hood (FIG. 2) and a frame 7 secured thereto on the trunk lid (FIG. 3). Each of the frames includes an insert 9 of substantially the same outer contours as the inner contour of its associated frame. The frames 3,5 and 7 are designed so that each has an open end 11 with the cross section of the inner portion of the frame thereafter being of the same dimension as the open end 11 or gradually decreasing in width so that a panel 9 can be inserted at the open end and move into the frame in the manner shown in FIGS. 1 to 3. The panels 9 can be convex to conform to the outer contour of the vehicle surface.

Referring to FIG. 4, there is shown the frame 5 affixed to the vehicle surface 13 by appropriate adhesive or by bolts, rivets or the like (not shown) or by any other means as is readily apparent to those skilled in the art.

A locking member is provided which will lock the panels into the frame, the locking member not being accessible from the vehicle exterior so that panels will not be easily removed by vandals or the like. Referring now to FIGS. 5 and 6, there is shown the frame 5 secured to vehicle surface 13 with a panel 9 therein. A U-shaped member 15 has one end of the U fitted into the open end 11 of the frame 5 and passing around the edge of the surface 13 to the vehicle interior wherein the member 15 is lockingly affixed to the vehicle 1 at the vehicle interior by a screw member 17. It should be understood that, though a screw member 17 is shown, any key operated or other means which will provide the locking function can be used as is apparent to those skilled in the art.

As an alternative, in place of the U-shaped member, the screw 17 alone could pass through the vehicle surface 13 and thread into the panel 9 directly to lock the panel in the frame.

Referring now to FIG. 7, there is shown a second embodiment of the present invention. In this figure there is shown a vehicle surface 21 such as a door, roof, hood, trunk lid or the like having an indentation 23 formed therein. The surface of the indented portion 31 is substantially planar or flat. An insert 25 having substantially the same shape as the indentation preferably, but in any event having a shape such that it can not be rotated in the indentation and preferably a flat surface abutting the indentation is positioned in the indentation. A locking member 27 is secured to the insert 25 and is accessible only from the side of the insert intimate with the vehicle surface. The locking member 27 can be a threaded member and can be molded into the insert 25 as shown or can be secured to the surface of the insert. A nut 29 is threaded onto the threaded portion of locking member 27 to secure the panel 25 to the vehicle within the indentation. Several such locking members can be used on a single panel, if desired. The locking member 27 is accessible only from the interior of the vehicle.

It is also readily apparent that the embodiment of FIGS. 1 to 6 can be utilized without the frame wherein the frame is replaced by an indentation in the vehicle surface.

It can be seen that, in accordance with the present invention, there is provided an easily replaceable panel for vehicles which is both decorative and protective and can easily and economically be installed.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

I claim:

1. A removable locking panel for a vehicle which comprises:
   (a) a frame region on the exterior surface of a vehicle, said frame region having an open end and substantially the same or continuously narrower dimension in a direction away from said open end;
   (b) a panel of substantially the same outer contour as the inner contour of said frame region removably positioned in said frame; and
   (c) locking means, accessible and operable only from the interior of said vehicle and positioned within said frame region and the interior of said vehicle.

2. In a removable lockable panel for a vehicle having a frame region on an outer surface thereof, the frame region having at least one aperture therein, comprising:
   (a) a panel of substantially the same outer contour as said framed region and not rotatable in said frame region, removably positioned in said frame region,
   (b) locking means secured to said panel and user accessible only from the side of said panel intimate with the surface of said vehicle within said framed region, said locking means extending through said aperture; and
   (c) means positioned adjacent the inner surface of said framed region for securing said locking member to said vehicle surface.

3. A panel as set forth in claim 2 wherein said frame region is an indentation in the surface of said vehicle.

4. A panel as set forth in claim 2 wherein said locking means is a threaded member secured in said panel and said means positioned in a threaded member engaging the threads of said locking means.

5. A panel as set forth in claim 3 wherein said locking means is a threaded member secured in said panel and said means positioned is a threaded member engaging the threads of said locking means.

* * * * *